US012756995B2

United States Patent

(12) United States Patent
Briggs et al.
(10) Patent No.: US 12,756,995 B2
(45) Date of Patent: Oct. 6, 2026

(54) CONCEPTS AND METHODS FOR POOL SYSTEM COMMUNICATION BETWEEN CONNECTABLE DEVICES

(71) Applicant: FLUIDRA GROUP AUSTRALIA PTY LTD., Smithfield (AU)

(72) Inventors: Rod Briggs, Beaumaris (AU); Frank Harris, Malvern East (AU); Steve Fallon, Sassafras (AU); Dime Risteski, Aintree (AU); Ethan Achterberg, Carrum Downs (AU)

(73) Assignee: FLUIDRA GROUP AUSTRALIA PTY LTD., Smithfield NSW (AU)

( * ) Notice: Subject to any disclaimer, the term of this patent is extended or adjusted under 35 U.S.C. 154(b) by 1025 days.

(21) Appl. No.: 17/707,463

(22) Filed: Mar. 29, 2022

(65) Prior Publication Data

US 2022/0312160 A1 Sep. 29, 2022

Related U.S. Application Data

(60) Provisional application No. 63/319,023, filed on Mar. 11, 2022, provisional application No. 63/167,609, filed on Mar. 29, 2021.

(51) Int. Cl.
*H04W 4/30* (2018.01)
*E04H 4/12* (2006.01)
(Continued)

(52) U.S. Cl.
CPC ............ *H04W 4/30* (2018.02); *E04H 4/1281* (2013.01); *G06F 8/65* (2013.01); *H04W 4/80* (2018.02)

(58) Field of Classification Search
CPC ........ C02F 1/008; C02F 1/4674; C02F 1/467; C02F 1/461; C02F 1/46104;
(Continued)

(56) References Cited

U.S. PATENT DOCUMENTS

| | | | | |
|---|---|---|---|---|
| 5,034,110 | A | 7/1991 | Glore et al. | |
| 2011/0253637 | A1* | 10/2011 | McCague | C02F 1/4674 210/744 |
| 2018/0240322 | A1* | 8/2018 | Potucek | E04H 4/14 |
| 2019/0314243 | A1* | 10/2019 | MacCallum | H04L 12/281 |
| 2020/0319621 | A1* | 10/2020 | Roy | G01L 19/086 |
| 2020/0325041 | A1* | 10/2020 | Cosentino | C02F 1/4674 |

FOREIGN PATENT DOCUMENTS

| | | | | |
|---|---|---|---|---|
| CN | 113853358 | A | 12/2021 | |
| FR | 2908138 | A1 | 5/2008 | |
| WO | WO-2006058369 | A1 * | 6/2006 | C25B 15/02 |
| WO | 2022208361 | A1 | 10/2022 | |

OTHER PUBLICATIONS

International Application No. PCT/IB2023/052335, International Preliminary Report on Patentability, Sep. 26, 2024, 9 pages.

(Continued)

*Primary Examiner* — Akash K Varma
(74) *Attorney, Agent, or Firm* — Kilpatrick Townsend & Stockton LLP

(57) ABSTRACT

A chlorinator system includes a swimming pool chlorinator, at least one transceiver that provides short-range communication between the swimming pool chlorinator and at least one pool and spa system component, a processor, and a non-transitory computer-readable storage medium containing instructions that, when executed by the processor, cause the processor to perform operations. The operations include receiving a short-range wireless communication request originating from the at least one pool and spa system component. Additionally, the operations include establishing a short-range wireless communication link with the at least one pool and spa system component. Further, the operations include receiving a control request from a remote computing device with instructions to control the at least one pool and spa system component and controlling the at least one transceiver to wirelessly transmit control signals to the at least one pool and spa system component.

9 Claims, 6 Drawing Sheets

(51) Int. Cl.
*G06F 8/65* (2018.01)
*H04W 4/80* (2018.01)

(58) Field of Classification Search
CPC .......... C02F 2103/42; C02F 2201/4612; C02F 2201/46; C02F 2201/46135; C02F 2201/4614; C02F 2201/46165; C02F 2201/4617; C02F 2209/006; C02F 2209/008; C02F 2303/04; E04H 4/1281; E04H 4/1209; E04H 4/00; E04H 4/12; H04W 4/30; H04W 4/80; H04W 84/18; H04M 1/72415; H04M 1/72; H04L 67/12; H04L 67/125; H04L 12/2818; H04L 12/28; H04L 12/2803; H04L 12/2816; H04L 12/2823; H02M 3/158; H02M 3/1582; H02M 7/217; H02M 7/00; H02M 7/2195; H02M 7/219; G06F 8/65; G06F 8/654; F21V 23/02; F21W 2131/401
USPC ...................................................... 210/167.11
See application file for complete search history.

(56) References Cited

OTHER PUBLICATIONS

International Application No. PCT/IB2022/052905, International Preliminary Report on Patentability mailed on Oct. 12, 2023, 6 pages.
International Application No. PCT/IB2022/052905, International Search Report and Written Opinion mailed on May 16, 2022, 10 pages.
International Application No. PCT/IB2023/052335, International Search Report and the Written Opinion mailed Jun. 6, 2023, 13 pages.
European Application No. 22779277.7, Extended European Search Report mailed on May 7, 2024, 11 pages.
European Patent Application 23766249.9, Extended European Search Report mailed on Jul. 3, 2025, 10 pages.
U.S. Appl. No. 18/120,240, Notice of Allowance mailed on Nov. 12, 2025, 14 pages.
U.S. Appl. No. 18/120,240, Notice of Allowability mailed on Nov. 24, 2025, 10 pages.

* cited by examiner

CONCEPTS AND METHODS FOR POOL SYSTEM COMMUNICATION BETWEEN CONNECTABLE DEVICES

CROSS-REFERENCE TO RELATED APPLICATIONS

This application claims the benefit of U.S. Provisional Patent Application No. 63/319,023, filed on Mar. 11, 2022, and entitled "CHLORINATOR SYNCHRONOUS RECTIFICATION," and U.S. Provisional Patent Application No. 63/167,609, filed on Mar. 29, 2021, and entitled "CONNECTABLE DEVICES," the contents of which are hereby incorporated by reference in their entireties for all purposes.

TECHNICAL FIELD

This disclosure relates to pool system communication, and more specifically, although not necessarily exclusively, to concepts and methods for improving efficiency and communication of devices that operate in swimming pools or spas.

BACKGROUND

Equipment such as chlorinators and pumps, for example, may be included as components of water-recirculation systems of swimming pools and spas. Historically, this equipment has lacked electronic communications capabilities. Indeed, some components of these water-recirculation systems may lack even an electrical supply, wholly preventing them from communicating with other components of a pool system electronically.

An inability to adjust operations of pool and spa equipment remotely and through a central communication system may limit the overall functionality of the pool and spa system. For example, without the ability to provide communication between pool and spa equipment, various components of the pool and spa system may operate independent from one another. This independent operation may limit an overall functionality of the pool and spa system.

SUMMARY

Embodiments described in this disclosure are defined by the claims below, not this summary. This summary is a high-level overview of various embodiments and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification, any or all drawings, and each claim.

According to certain embodiments, a chlorinator system includes a swimming pool chlorinator, at least one transceiver that provides short-range communication between the swimming pool chlorinator and at least one pool and spa system component, a processor, and a non-transitory computer-readable storage medium containing instructions that, when executed by the processor, cause the processor to perform operations. The operations include receiving a short-range wireless communication request originating from the at least one pool and spa system component. Additionally, the operations include establishing a short-range wireless communication link with the at least one pool and spa system component. Further, the operations include receiving a control request from a remote computing device with instructions to control the at least one pool and spa system component and controlling the at least one transceiver to wirelessly transmit control signals to the at least one pool and spa system component.

According to some embodiments, a non-transitory computer-readable storage medium includes instructions that, when executed by a processor, cause the processor to perform operations. The operations include receiving, at a chlorinator, a wireless communication request from a remote computing device. The operations also include establishing, by the chlorinator, a wireless communication link with the remote computing device. Additionally, the operations include receiving, at the chlorinator, a plurality of short-range wireless communication requests from a plurality of pool and spa system components. Further, the operations include establishing, by the chlorinator, a plurality of short-range wireless communication links with the plurality of pool and spa system components. The operations also include wirelessly receiving, at the chlorinator, a control request from the remote computing device with instructions to control at least one pool and spa system component of the plurality of pool and spa system components and wirelessly transmitting, by the chlorinator, control signals to the plurality of pool and spa system components.

According to various embodiments, a computer-implemented method includes receiving, at a chlorinator, a wireless communication request from a remote computing device and establishing, by the chlorinator, a plurality of wireless communication links with the remote computing device. Additionally, the computer-implemented method includes receiving, at the chlorinator, a short-range wireless communication request from at least one pool and spa system component. The computer-implemented method also includes establishing, by the chlorinator, a short-range wireless communication link with the at least one pool and spa system component. Further, the computer-implemented method includes wirelessly receiving, at the chlorinator, a control request from the remote computing device with instructions to control the at least one pool and spa system component and wirelessly transmitting, by the chlorinator, control signals to the at least one pool and spa system component.

Various implementations described herein can include additional systems, methods, features, and advantages, which cannot necessarily be expressly disclosed herein but will be apparent to one of ordinary skill in the art upon examination of the following detailed description and accompanying drawings. It is intended that all such systems, methods, features, and advantages be included within the present disclosure and protected by the accompanying claims.

BRIEF DESCRIPTION OF THE DRAWINGS

The specification makes reference to the following appended figures, in which use of like reference numerals in different figures is intended to illustrate like or analogous components.

DESCRIPTION

The subject matter of the present embodiments is described herein with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described. Directional references such as "up," "down," "top," "bottom," "left," "right," "front," and "back," among others, are intended to refer to the orientation as illustrated and described in the figure (or figures) to which the components and directions are referencing. References to "pools" and "swimming pools" herein may also refer to spas or other water containing vessels used for recreation or therapy.

Described herein are systems and methods for establishing wireless communication between pool and spa system equipment, such as a chlorinator and other auxiliary pool and spa equipment. In certain aspects, the systems and methods described herein may avoid a need for wired communication between components of the pool system. Beneficially (but not necessarily), the communications used to control the pool and spa equipment may be routed through a chlorinator. In some examples, the chlorinator may wirelessly couple to the pool and spa equipment with a short-range wireless communication scheme, such as through Bluetooth® communications. Additionally, the chlorinator may communicate with a mobile device operating a pool system control application through the short-range wireless communication scheme, if within range, or through a wireless internet connection if out of short-range communication range. Although the systems and methods are described for use in connection with water containing vessels, persons skilled in the relevant field will recognize that the presently disclosed subject matter may be employed in other manners.

Figure 1:
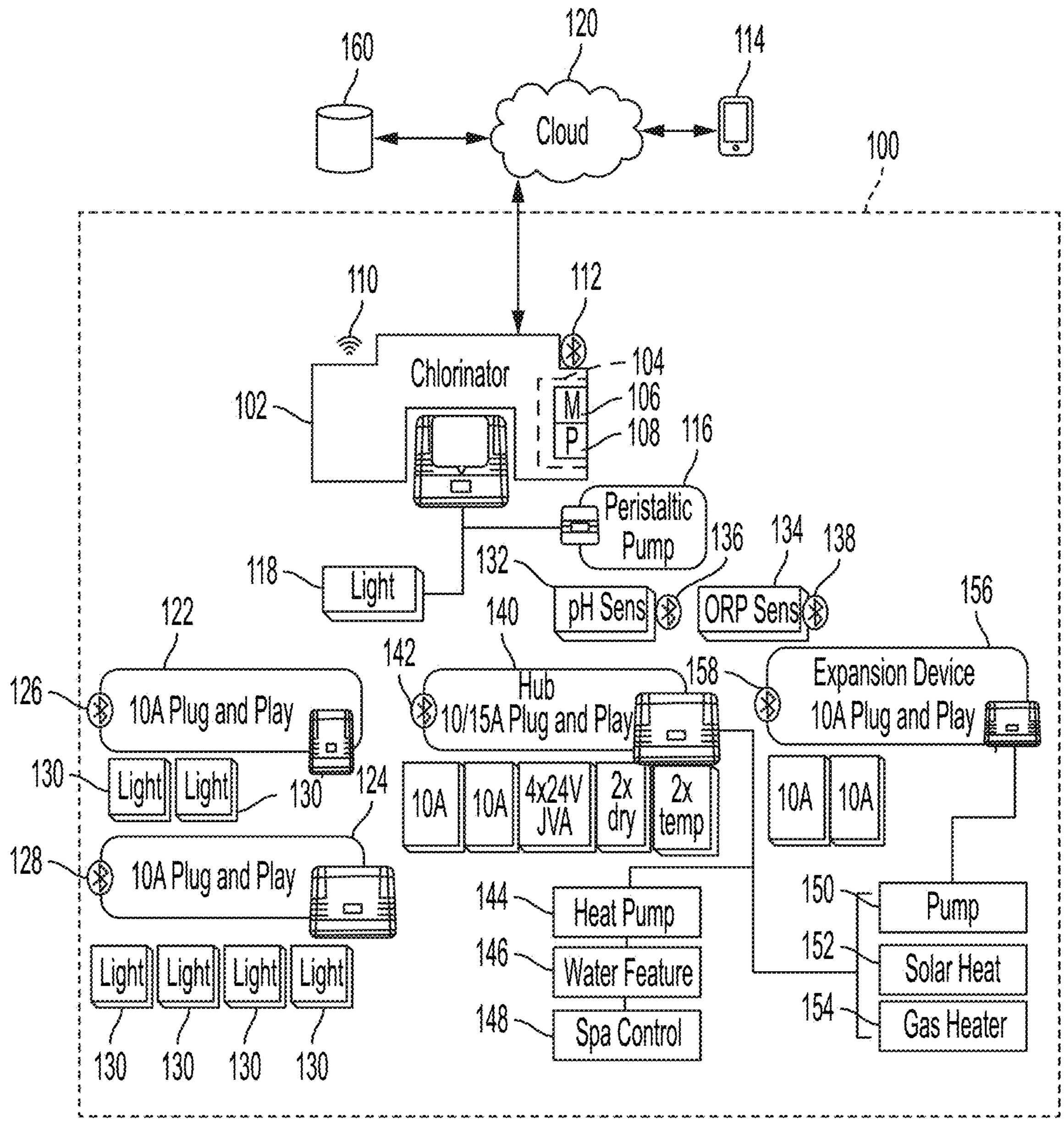
FIG. 1 illustrates a communication scheme of pool and spa equipment of a pool system according to embodiments of the disclosure.

FIG. 1 illustrates a communication scheme of pool and spa equipment of a pool system 100 according to embodiments of the disclosure. The pool system 100 may include equipment associated with maintaining a pool or spa. For example, the pool system 100 may include a series of connectable devices that perform pool related functions. As illustrated, a chlorinator 102, which operates to chlorinate a salt water pool or spa, may function as a communication hub for the pool system 100. For example, the chlorinator 102 includes a computing system 104 that includes a memory device 106 and a processor 108. The computing system 104 may control operation of antennas 110 and 112, which are used to communicate with other pool and spa components and with a remote computing device 114. For example, the antenna 110 may be used to connect to a wireless router or to a cellular data network for access to the cloud 120, and the antenna 112 may be used in short-range communication, such as in a Bluetooth® communication scheme. As used herein, the term "short-range communication" may refer to a communication scheme that is only available for a limited distance from the chlorinator 102. In some examples, the limited distance may be 10 meters, 20 meters, 30 meters, or a larger distance from the chlorinator 102 depending on the specific nature of the antenna 112 used for the short-range communication.

In addition to providing communication links, the chlorinator 102 may also provide power to a peristaltic pump 116 and a light 118. Other pool and spa components may also receive power directly from the chlorinator 102. In some examples, the chlorinator 102 may receive alternating current (AC) power from a mains power source and rectify the AC power to provide DC power to the chlorinator 102 and the other pool and spa components.

By providing access to the cloud 120, the chlorinator 102, which operates as a communication hub for components of the pool system 100, may provide a mechanism for an end user to interact with or otherwise control the pool system 100 from the remote computing device 114 that operates a pool system control application. The remote computing device 114 may be a mobile phone, a computer, a laptop, a tablet, or any other electronic device remote from the pool system 100. As used herein, the term "remote" may refer to a component that is not physically coupled to a component of the pool system 100. The wireless communication provided by the chlorinator 102 may be a mechanism to reduce or avoid an amount of wired communication between the components of the pool system 100. For example, the components of the pool system 100 may all be powered using mains power received from electrical outlets, and the communication between devices may all be wireless through the chlorinator 102. In some examples, even components of the pool system 100 that receive power from the chlorinator 102, such as the peristaltic pump 116 and the light 118, may communicate with the chlorinator 102 wirelessly.

Light controllers 122 and 124 may be powered by their own power sources, such as mains power. The light controllers 122 and 124 may include short-range communication antennas 126 and 128 that are able to transmit and receive communication signals from the antenna 112 of the chlorinator 102. The communication signals received from the chlorinator 102 may be instructions for the light controllers 122 and 124 to control lights 130 of the pool system 100. In some examples, the light controllers 122 and 124 may also be standalone light controllers that are able to receive control instructions directly from the remote computing device 114. In an example where the light controllers 122 and 124 are standalone light controllers, the light controllers 122 and 124 may cross-communicate with the chlorinator 102 such that the standalone light controllers 122 and 124 are communicatively slaved to the chlorinator 102. In other words, the chlorinator 102 may relay control signals from a remote computing device 114 to the light controller 122 and 124.

A pH sensor 132, an oxidation reduction potential (ORP) sensor 134, or any additional sensors for the pool system 100 may also communicate with the antenna 112 of the chlorinator 102 using short-range antennas 136 and 138. The sensors 132 and 134 may feed information to the chlorinator 102 such that the chlorinator 102 is able to activate and deactivate the chlorinator cells to match a chlorine demand for the pool. The chlorinator 102 may also use the information provided by the sensors 132 and 134 to control operation of the peristaltic pump to add acid to the pool to maintain a desired pH balance.

A hub device 140 may include a short-range antenna 142 that is able to communicate with the antenna 112 of the chlorinator 102. The hub device 140 may include a number of 10 A sockets and a series of inputs that enable other components of the pool system to be controlled by the chlorinator 102. For example, a heat pump 144, a water feature 146, a spa controller 148, a pump 150, a solar heater 152, a gas heater 154, or any combination thereof may be connected to the hub device 140 for wireless control by the chlorinator 102. Other components of the pool system 100, such as valve actuators, may also be connected to the hub device 140 for control by the chlorinator 102. In an example, the hub device 140 may receive power from a mains power connection, or any other power source, and be wirelessly coupled to the chlorinator 102 through a short-range communication scheme, such as Bluetooth® communication.

An expansion device 156 may also include a short-range antenna 158 that is able to communicate with the antenna 112 of the chlorinator 102. The expansion device 156 may include a number of 10 A sockets and a series of temperature sensor inputs that enable other components of the pool system to be controlled by the chlorinator 102. For example, the pump 150, the solar heater 152, the gas heater 154, or any combination thereof may be connected to the expansion device 156 for wireless control by the chlorinator 102. Other components of the pool system 100, such as valve actuators, may also be connected to the expansion device 156 for control by the chlorinator 102. In an example, the expansion device 156 may receive power from a mains power connection, or any other power source, and be wirelessly coupled to the chlorinator 102 through a short-range communication scheme, such as Bluetooth® communication.

While the light controllers 122 and 124 can, in some examples, operate as both slave devices to the chlorinator 102 and as standalone devices, the sensors 132 and 134, the hub device 140, and the expansion device 156 may, in some examples, all operate exclusively as slave devices to the chlorinator 102. In some examples, the short-range communication scheme between the chlorinator 102 and the other components of the pool system 100 may form a Bluetooth® mesh network.

In some examples, the chlorinator 102 may communicate with the remote computing device 114 using either a short-range communication scheme through the antenna 112 or through a wireless internet connection through the antenna 110 and the cloud 120. In some examples, the remote computing device 114 may make a determination about whether the remote computing device 114 is within range of the short-range antenna 112 of the chlorinator 102. If the remote computing device 114 is within range of the short-range antenna 112, then the remote computing device 114 may automatically communicate with the chlorinator 102 using the short-range communication scheme. If the remote computing device 114 is not within range of the short-range antenna 112, then the remote computing device 114 may communicate with the chlorinator 102 using the cloud 120 and the antenna 110.

Further, the chlorinator 102 may communicate with a remote database 160 that maintains firmware updates for the components of the pool system 100. For example, the chlorinator 102 may download a firmware package from the remote database 160 through the cloud 120 and verify the authenticity of the firmware package. In some examples, the chlorinator 102 may download the firmware package from the remote computing device 114, or any other remote computing device, either locally through the short-range communication scheme or remotely through the wireless internet connection. The firmware package may include one or more instances of firmware intended for one or more of the connected components of the pool system 100. The chlorinator 102 may open the firmware package and transmit individual firmware updates to respective connected components (e.g., the hub device 140, the expansion device 156, the lighting controller 122 and 124, the sensors 132 and 134, etc.) of the pool system 100.

In some examples, the pool system 100 may initially include a limited number of external components. The wireless communication scheme provided by the chlorinator 102 may enable modularity to the external components of the pool system 100. For example, the external components of the pool system 100 may be added to the short-range communication network of the chlorinator 102 overtime in a seamless manner. Further, a control menu of the chlorinator 102 and the remote computing device 114 may be dynamically updated as new external components when new available operations are added to the short-range communication network of the chlorinator 102.

Figure 2:
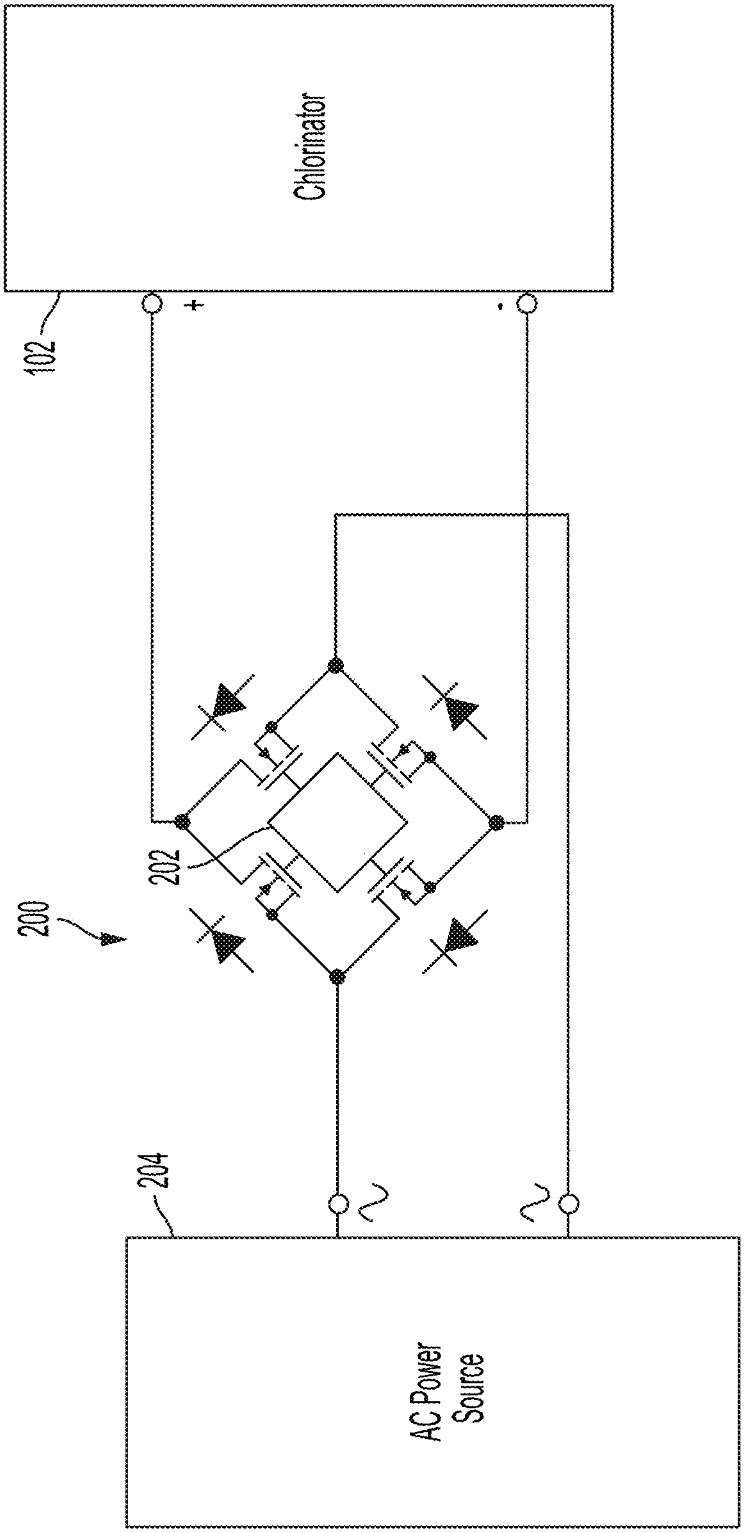
FIG. 2 illustrates a synchronous rectifier of a chlorinator of the pool system of FIG. 1 according to embodiments of the disclosure.

FIG. 2 illustrates an example of a synchronous rectifier 200 of the chlorinator 102 according to embodiments of the disclosure. The synchronous rectifier 200 may include a synchronous rectifier chipset 202, such as an LT4320 chip, that is capable of controlling a synchronous rectification process. Other chips capable of controlling a synchronous rectification process may also be used in addition to or in place of the synchronous rectifier chipset 202. The synchronous rectification process may enable rectification of an AC power source 204 to provide DC power to the chlorinator 102.

Synchronous rectification may be used in a "switched-mode" power supply or in a linear power supply. Due to a higher operating frequency of the switched-mode power supply (e.g., 50 kHz-1 MHz) compared to a linear power supply (e.g., with a frequency similar to mains power of 50 or 60 Hz), the synchronous rectification at the switched-mode power supply may be used in conjunction with a smaller transformer than a transformer used in the linear power supply.

In an example, a power supply of the chlorinator 102 provides DC power to a chlorine generating cell of the chlorinator 102. The DC power may be converted from the AC power source 204 using the synchronous rectifier 200. Because heat generated from the synchronous rectifier 200 is minimal, the physical size of a chlorinator power supply may be reduced due to avoiding the need for components to address excess heat generated from internal resistances of diode or SCR rectifiers, for example.

Figure 3:
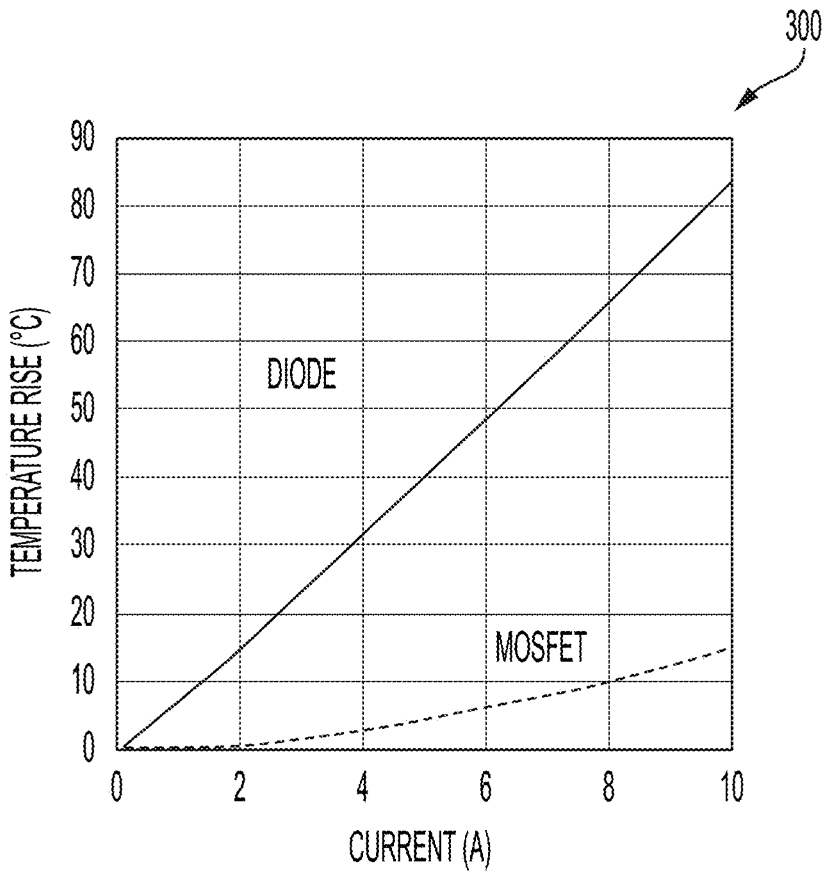
FIG. 3 illustrates a temperature chart comparing a metal-oxide-semiconductor field-effect transistor (MOSFET) of the synchronous rectifier of FIG. 2 with a diode according to embodiments of the disclosure.

Turning to FIG. 3, a temperature chart 300 comparing a metal-oxide-semiconductor field-effect transistor (MOSFET) of the synchronous rectifier 200 with a diode is illustrated according to embodiments of the disclosure. The temperature chart 300 provides an example of the temperature rises of a typical diode (e.g., in a non-synchronous rectifier) and a typical MOSFET (e.g., in a synchronous rectifier). As depicted, the temperature rise of the MOSFET during operation of the synchronous rectifier 200 is small relative to the temperature rise of a typical diode during operation of a non-synchronous rectifier. Accordingly, the implementation of the synchronous rectifier 200 in the chlorinator 102 of the pool system 100 to provide DC power to the chlorinator 102 may enable a reduction in a number of overall components of the chlorinator 102 and a reduction in the physical size of the chlorinator 102. In such an example, the chlorinator 102 may avoid cumbersome heat-sink fins or fan systems. While synchronous rectification is described above using MOSFETs, other high current transistors or FETs may also be used.

Figure 4:
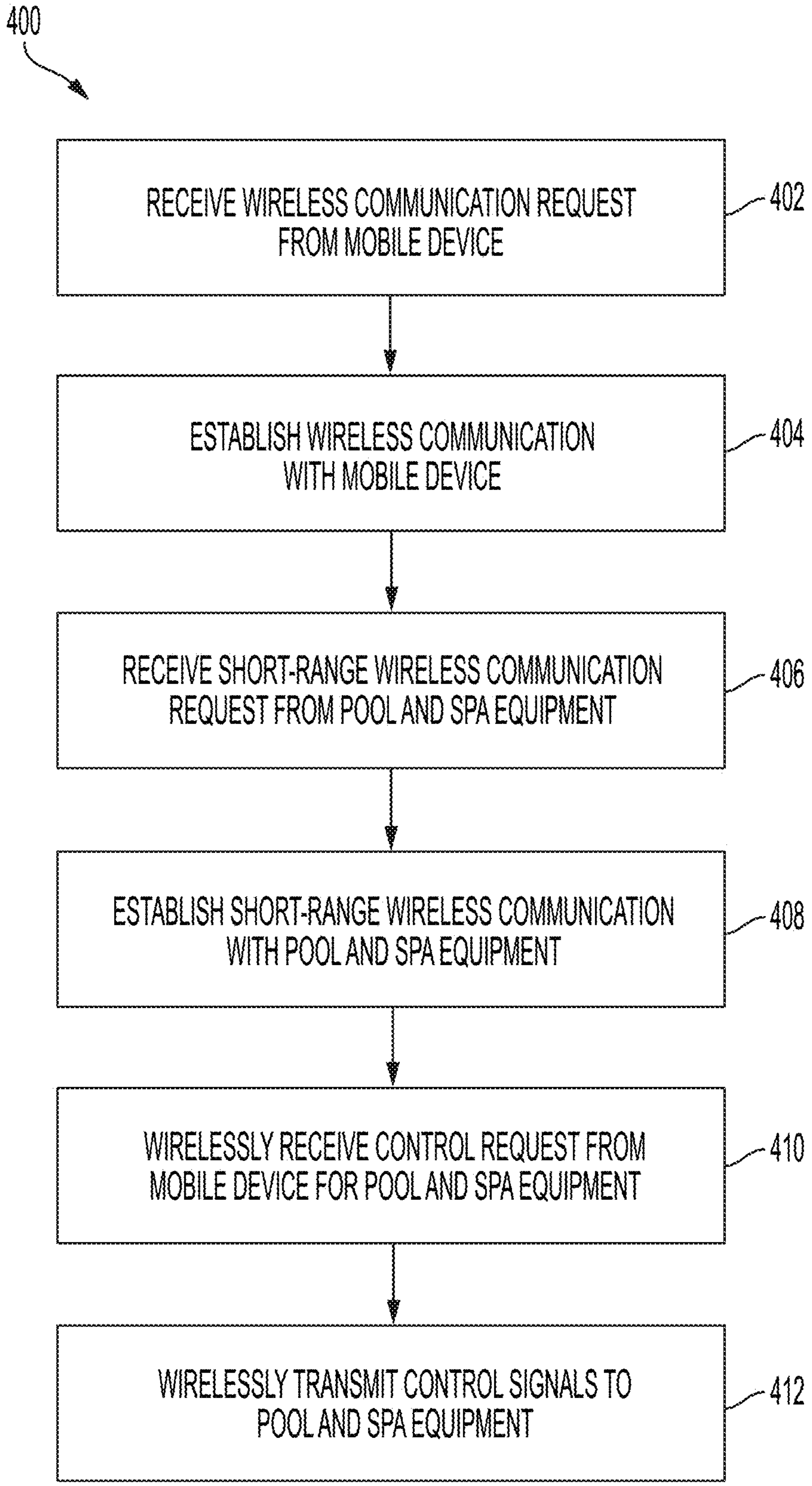
FIG. 4 illustrates a flowchart of a process for wirelessly controlling pool and spa equipment of the pool system of FIG. 1 according to embodiments of the disclosure.

FIG. 4 illustrates a flowchart of a process 400 for wirelessly controlling pool and spa equipment of the pool system 100 according to embodiments of the disclosure. At block 402, the process 400 involves the chlorinator 102 receiving a wireless communication request from a mobile device, such as the remote computing device 114. The wireless communication request may be an indication to the chlorinator 102 that the mobile device would like to establish a wireless connection with the chlorinator 102. In some examples, the wireless communication request can only be received by the chlorinator 102 when the mobile device is within short-range communication range of the chlorinator 102. This physical proximity requirement may prevent bad actors from hacking into the wireless communication scheme of the pool system 100.

At block 404, the process 400 involves the chlorinator 102 establishing wireless communication with the mobile device. In some examples, the chlorinator 102 may verify that the mobile device is authorized to establish the wireless communication with the chlorinator 102 through various security protocols. Additionally, wireless communication may be established between the chlorinator 102 and the mobile device through a short-range communication link (e.g., a Bluetooth® communication scheme) or through a wireless internet communication link.

At block 406, the process 400 involves the chlorinator 102 receiving a short-range wireless communication request from pool and spa equipment of the pool system 100. The short-range wireless communication request may be a request from a component of the pool system 100 that the component would like to receive control instructions from the chlorinator 102. In some examples, the chlorinator 102 may receive short-range wireless communication requests from a number of components of the pool system 100.

At block 408, the process 400 involves the chlorinator 102 establishing a short-range wireless communication link with the requesting components of the pool system 100. In some examples, the chlorinator 102 may verify the authenticity of the components. For example, the chlorinator 102 may verify whether a component is authorized to establish the short-range wireless communication link with the chlorinator 102 through various security protocols. The short-range communication link with the components of the pool system 100 may establish a short-range wireless mesh network of the pool system 100.

At block 410, the process 400 involves the chlorinator 102 wirelessly receiving a control request from the mobile device to control a component of the pool system 100. For example, the control request may involve a request to turn on a pool heater to begin heating the pool. Other pool control requests may also be received by the chlorinator from the mobile device. In some examples, the chlorinator 102 may receive the control requests from the mobile device using the short-range communication scheme. In other examples, the chlorinator may receive the control requests from a wireless internet communication link with the mobile device through the cloud 120.

At block 412, the process 400 involves the chlorinator 102 wirelessly transmitting control signals using the short-range wireless communication link to the components of the pool system 100. The control signals may instruct the components of the pool system 100 to perform operations identified by a user of the mobile device. For example, the control signals may instruct a pool heater to raise the temperature of the pool to a specified temperature.

Figure 5:
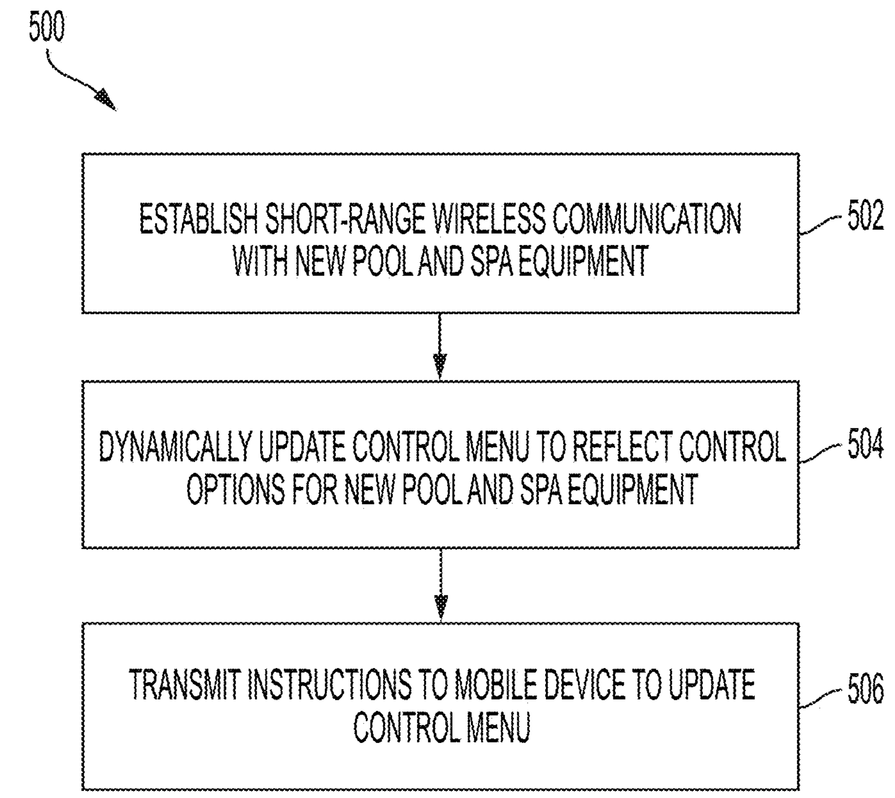
FIG. 5 illustrates a flowchart of a process for dynamically updating a control menu for the pool system of FIG. 1 according to embodiments of the disclosure.

FIG. 5 illustrates a flowchart of a process 500 for dynamically updating a control menu for the pool system 100 according to embodiments of the disclosure. At block 502, the process 500 involves the chlorinator 102 establishing a short-range wireless communication link with additional pool and spa equipment. For example, a pool owner may add a new hub device 140 to the pool system 100, and the chlorinator 102 may establish a short-range wireless communication link with the new hub device 140.

At block 504, the process 500 involves the chlorinator 102 dynamically updating a control menu to reflect control options for the new pool and spa equipment. In some examples, the new pool and spa equipment may introduce new control functionalities for the pool system 100. The chlorinator 102 may identify the new control functionalities by detecting a type or types of newly added pool and spa equipment. Based on the types of newly added equipment, the chlorinator 102 can update the control menu in a manner that enables control functionality of various new control features of the newly added equipment.

At block 506, the process 500 involves the chlorinator 102 transmitting instructions to a mobile device communicatively coupled to the chlorinator 102 to update a control menu provided to a user on the mobile device. For example, the new control functionality of the newly added equipment may be added to a control menu of the mobile device. The new control functionality added to the control menu may enable a user to control the new features of the pool system 100 provided by the newly added equipment.

Figure 6:
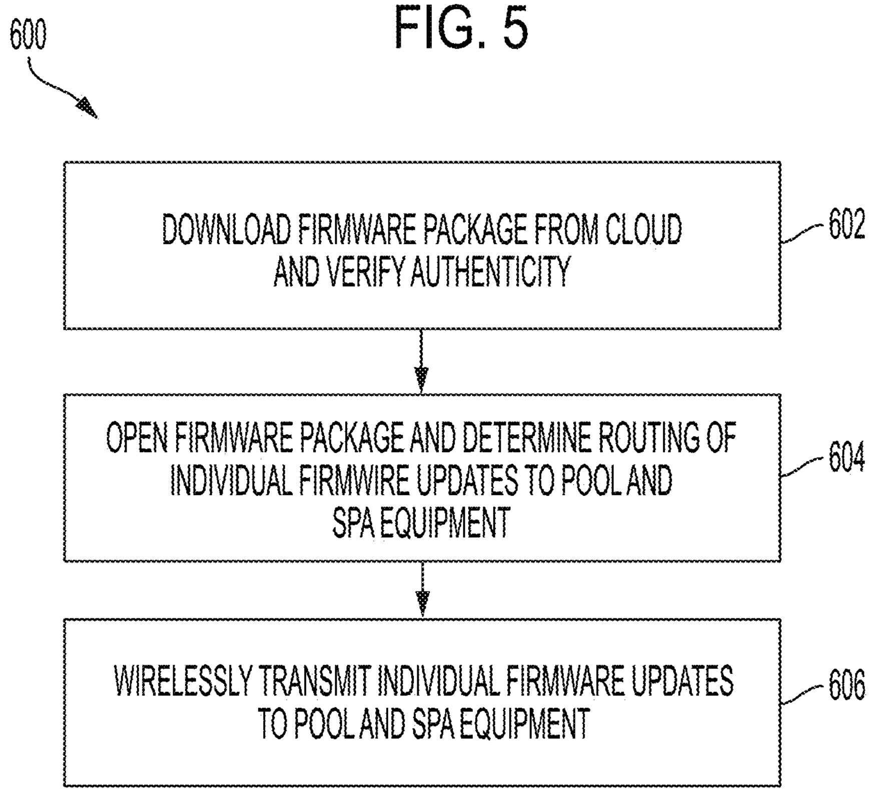
FIG. 6 illustrates a flowchart of a process for wirelessly updating firmware of the pool and spa equipment of the pool system of FIG. 1 according to embodiments of the disclosure.

FIG. 6 illustrates a flowchart of a process 600 for wirelessly updating firmware of the pool and spa equipment of the pool system 100 according to embodiments of the disclosure. At block 602, the process 600 involves the chlorinator 102 downloading a firmware package from the cloud 120 or from the remote computing device 114 and verifying the authenticity of the firmware package. In an example, the firmware package may include a set of individual firmware updates for various components of the pool system 100. The chlorinator 102, in an example, may verify that the firmware package is authentic using various security protocols.

At block 604, the process 600 involves the chlorinator 102 opening the firmware package and determining routing of the individual firmware updates to the components of the pool system 100. For example, the chlorinator 102 may determine which individual firmware update corresponds with each individual component of the pool system 100.

At block 606, the process 600 involves the chlorinator 102 wirelessly transmitting the individual firmware updates to the respective components of the pool system 100. Upon receiving the individual firmware updates, the components of the pool system 100 may commence completion of their respective firmware updates.

Figure 7:
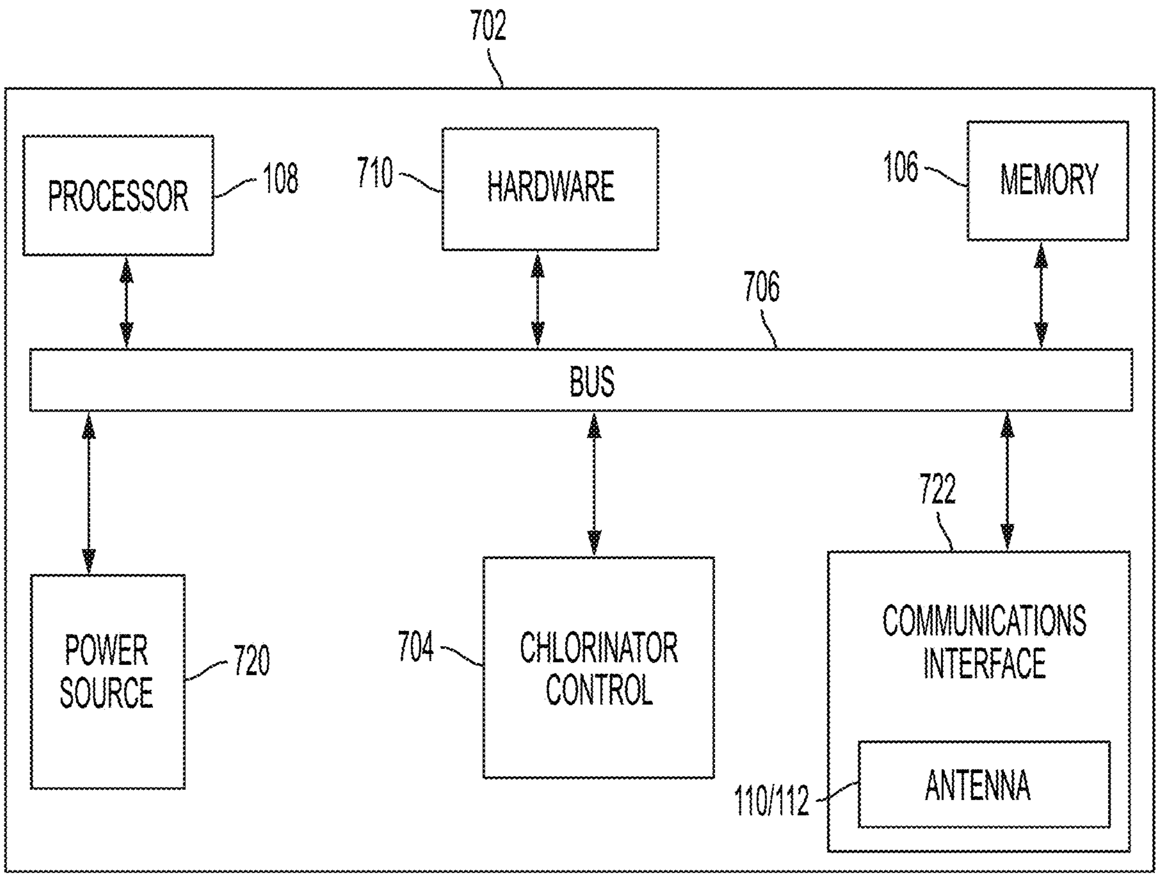
FIG. 7 is a block diagram of an example of a computing system usable with a chlorinator system according to some aspects of the present disclosure.

FIG. 7 is a block diagram of an example of a computing system 702, such as the computing system 104 of FIG. 1, usable with the chlorinator 102 according to some aspects. In some examples, the components shown in FIG. 7 (e.g., the power source 720, chlorinator control 704, communications interface 722, processor 108, memory 106, and hardware 710) can be integrated into a single structure. For example, the components can be within a single housing, such as within the housing of the chlorinator 102. In other examples, the components shown in FIG. 7 can be distributed (e.g., in separate housings) and in electrical communication with each other.

The computing system 702 can include the processor 108, the memory 106, and a bus 706. The processor 108 can execute one or more operations for operating the computing system 702. The processor 108 can execute instructions stored in the memory 106 to perform the operations. The processor 108 can include one processing device or multiple processing devices. Non-limiting examples of the processor 108 include a Field-Programmable Gate Array ("FPGA"), an application-specific integrated circuit ("ASIC"), a microprocessor, etc.

The processor 108 can be communicatively coupled to the memory 106 via the bus 706. The non-volatile memory 106 may include any type of memory device that retains stored information when powered off. Non-limiting examples of the memory 106 include electrically erasable and programmable read-only memory ("EEPROM"), flash memory, or any other type of non-volatile memory. In some examples, at least some of the memory 106 can include a non-transitory medium from which the processor 108 can read instructions. A non-transitory computer-readable medium can include electronic, optical, magnetic, or other storage devices capable of providing the processor 108 with computer-readable instructions or other program code. Non-limiting examples of a computer-readable medium include (but are not limited to) magnetic disk(s), memory chip(s), ROM, random-access memory ("RAM"), an ASIC, a configured processor, optical storage, or any other medium from which the processor 108 can read instructions. The instructions can include processor-specific instructions generated by a compiler or an interpreter from code written in any suitable computer-programming language, including, for example, C, C++, C#, etc.

The computing system 702 can include a power source 720. In some examples, the power source 720 can include the synchronous rectifier 200 (e.g., for rectifying an AC power source). The computing system 702 can include a communications interface 722. The communications interface 722 can include a wireless interface, which can include one or more antennas 110 or 112. In some examples, part of the communications interface 722 can be implemented in software. For example, the communications interface 722 can include instructions stored in memory 106.

The computing system 702 can use the communications interface 722 to communicate with one or more external devices. In some examples, the communications interface 722 can amplify, filter, demodulate, demultiplex, frequency shift, and otherwise manipulate a signal received from an external device, such as a pool and spa system component. The communications interface 722 can transmit a signal associated with the received signal to the processor 108 or the hardware 710. The processor 108 or hardware 710 can receive and analyze the signal to retrieve data associated with the received signal.

In some examples, the computing system 702 can analyze the data from the communications interface 722 and perform one or more functions. For example, the computing system 702 can generate a response based on the data. The computing system 702 (e.g., using the processor 108) can cause a response signal associated with the response to be transmitted to the communications interface 722. The communications interface 722 can generate a transmission signal (e.g., via the antenna 110 or 112) to communicate the response to a remote computing device. For example, the communications interface 722 can amplify, filter, modulate, frequency shift, multiplex, and otherwise manipulate the response signal to generate the transmission signal. In some examples, the communications interface 722 can encode data within the response signal using a modulation technique (e.g., frequency modulation, amplitude modulation, or phase modulation) to generate the transmission signal. The communications interface 722 can transmit the transmission signal to the antenna 110 or 112. The antenna 110 or 112 can receive the transmission signal and responsively generate a wireless communication. In this manner, the computing system 702 can receive, analyze, and respond to communications from an external electronic device.

In some examples, the computing system 702 can include more, fewer, or different components than those shown in FIG. 7. Additionally or alternatively, the components of the computing system 702 can be configured differently than the configuration shown in FIG. 7. For example, the computing system 702 may not include the processor 108, the memory 106, or both. In such an example, the processor 108, the memory 106, or both may be arranged as a distributed computing device.

A collection of exemplary examples is provided below providing additional description of a variety of example embodiments in accordance with the concepts described herein. These illustrations are not meant to be mutually exclusive, exhaustive, or restrictive; and the disclosure is not limited to these example illustrations but rather encompasses all possible modifications and variations within the scope of the issued claims and their equivalents.

As used below, any reference to a series of examples is to be understood as a reference to each of those examples disjunctively (e.g., "Examples 1-4" is to be understood as "Examples 1, 2, 3, or 4").

Example 1 is a chlorinator system comprising: a swimming pool chlorinator; at least one transceiver configured to provide short-range communication between the swimming pool chlorinator and at least one pool and spa system component; a processor; and a non-transitory computer-readable storage medium containing instructions that, when executed by the processor, cause the processor to perform operations comprising: receiving a short-range wireless communication request originating from the at least one pool and spa system component; establishing a short-range wireless communication link with the at least one pool and spa system component; receiving a control request from a remote computing device with instructions to control the at least one pool and spa system component, and controlling the at least one transceiver to wirelessly transmit control signals to the at least one pool and spa system component.

Example 2 is the chlorinator system of example 1, wherein the operations further comprise: receiving a wireless communication request from the remote computing device; and establishing a wireless communication link with the remote computing device.

Example 3 is the chlorinator system of example 2, wherein the wireless communication link comprises an additional short-range wireless communication link and a wireless internet communication link.

Example 4 is the chlorinator system of example 3, wherein the operations further comprise: determining that the remote computing device is within a short-range wireless communication range; and communicating with the remote computing device using the additional short-range wireless communication link.

Example 5 is the chlorinator system of examples 3-4, wherein the operations further comprise: determining that the remote computing device is not within a short-range wireless communication range; and communicating with the remote computing device using the wireless internet communication link.

Example 6 is the chlorinator system of examples 1-5, wherein the operations further comprise receiving an additional short-range wireless communication request from an additional pool and spa system component; establishing a short-range wireless communication link with the additional pool and spa system component; dynamically updating a control menu to reflect available control options for the additional pool and spa system component; and controlling the at least one transceiver to wirelessly transmit instructions to the remote computing device to update a remote control menu of the remote computing device to reflect available control options for the additional pool and spa system component.

Example 7 is the chlorinator system of examples 1-6, wherein the operations further comprise: downloading a firmware package from the remote computing device or a cloud source, determining routing of individual firmware updates of the firmware package to the at least one pool and spa component; and controlling the at least one transceiver to wirelessly transmit the individual firmware updates to the at least one pool and spa component.

Example 8 is the chlorinator system of examples 1-7, wherein the short-range wireless communication link comprises a Bluetooth communication link.

Example 9 is the chlorinator system of examples 1-8, wherein the at least one pool and spa component comprises a pool sensor, a pool lighting controller, a water feature, a spa controller, a pump, a heater, or any combination thereof.

Example 10 is the chlorinator system of examples 1-9, further comprising: a synchronous rectifier configured to convert an alternating current power source to a direct current power source to provide power to the swimming pool chlorinator, the at least one transceiver, the processor, and the non-transitory computer-readable storage medium.

Example 11 is the chlorinator system of examples 1-10, wherein the operations further comprise: modularly adding additional short-range communication links with additional pool or spa components such that the additional pool or spa components are controllable using control signals transmitted by the at least one transceiver.

Example 12 is a non-transitory computer-readable storage medium containing instructions that, when executed by a processor, cause the processor to perform operations comprising: receiving, at a chlorinator, a wireless communication request from a remote computing device, establishing, by the chlorinator, a wireless communication link with the remote computing device; receiving, at the chlorinator, a plurality of short-range wireless communication requests from a plurality of pool and spa system components; establishing, by the chlorinator, a plurality of short-range wireless communication links with the plurality of pool and spa system components, wirelessly receiving, at the chlorinator, a control request from the remote computing device with instructions to control at least one pool and spa system component of the plurality of pool and spa system components; and wirelessly transmitting, by the chlorinator, control signals to the plurality of pool and spa system components.

Example 13 is the non-transitory computer-readable storage medium of example 12, wherein a first pool and spa system component of the plurality of pool and spa system component comprises a different power source from the chlorinator, and wherein the plurality of short-range wireless communication links comprises a Bluetooth mesh network.

Example 14 is the non-transitory computer-readable storage medium of examples 12-13, wherein a first pool and spa system component of the plurality of pool and spa system comprises a standalone lighting controller configured to cross-communicate with the chlorinator such that the standalone lighting controller is communicatively slaved to the chlorinator.

Example 15 is the non-transitory computer-readable storage medium of examples 12-14, wherein the wireless communication link comprises an additional short-range wireless communication link and a wireless internet communication link.

Example 16 is a computer-implemented method, comprising: receiving, at a chlorinator, a wireless communication request from a remote computing device, establishing, by the chlorinator, a plurality of wireless communication links with the remote computing device; receiving, at the chlorinator, a short-range wireless communication request from at least one pool and spa system component; establishing, by the chlorinator, a short-range wireless communication link with the at least one pool and spa system component; wirelessly receiving, at the chlorinator, a control request from the remote computing device with instructions to control the at least one pool and spa system component; and wirelessly transmitting, by the chlorinator, control signals to the at least one pool and spa system component.

Example 17 is the computer-implemented method of example 16, wherein the remote computing device comprises a mobile electronic device and the plurality of wireless communication links comprise an additional short-range communication link and a wireless internet communication link.

Example 18 is the computer-implemented method of examples 16-17, further comprising: receiving, at the chlorinator, an additional short-range wireless communication request from an additional pool and spa system component; establishing, by the chlorinator, a short-range wireless communication link with the additional pool and spa system component; dynamically updating, at the chlorinator, a control menu to reflect available control options for the additional pool and spa system component; and transmitting, by the chlorinator, instructions to the remote computing device to update a remote control menu of the remote computing device to reflect available control options for the additional pool and spa system component.

Example 19 is the computer-implemented method of examples 16-18, further comprising downloading, by the chlorinator, a firmware package from the remote computing device or a cloud source; determining, by the chlorinator, routing of individual firmware updates of the firmware package to the at least one pool and spa component; and wirelessly transmitting, by the chlorinator, the individual firmware updates to the at least one pool and spa component.

Example 20 is the computer-implemented method of example(s) 16, wherein a first pool and spa system component of the at least one pool and spa system comprises a standalone lighting controller configured to cross-communicate with the chlorinator such that the standalone lighting controller is communicatively slaved to the chlorinator The above-described aspects are merely possible examples of implementations, merely set forth for a clear understanding of the principles of the present disclosure. Many variations and modifications can be made to the above-described embodiment(s) without departing substantially from the spirit and principles of the present disclosure. All such modifications and variations are intended to be included herein within the scope of the present disclosure, and all possible claims to individual aspects or combinations of elements or steps are intended to be supported by the present disclosure. Moreover, although specific terms are employed herein, as well as in the claims that follow, they are used only in a generic and descriptive sense, and not for the purposes of limiting the described embodiments, nor the claims that follow.

That which is claimed:

1. A chlorinator system comprising:

a swimming pool chlorinator;

at least one transceiver configured to provide short-range communication between the swimming pool chlorinator and at least one pool and spa system component;

a processor; and a non-transitory computer-readable storage medium containing instructions that, when executed by the processor, cause the processor to perform operations comprising:

receiving a short-range wireless communication request originating from the at least one pool and spa system component;

establishing a short-range wireless communication link with the at least one pool and spa system component;

receiving a wireless communication request from a remote computing device;

establishing a wireless communication link with the remote computing device, wherein the wireless communication link comprises an additional short-range wireless communication link and a wireless internet communication link;

receiving a control request from the remote computing device with instructions to control the at least one pool and spa system component; and controlling the at least one transceiver to wirelessly transmit control signals to the at least one pool and spa system component.

2. The chlorinator system of claim 1, wherein the operations further comprise:

determining that the remote computing device is within a short-range wireless communication range; and communicating with the remote computing device using the additional short-range wireless communication link.

3. The chlorinator system of claim 1, wherein the operations further comprise:

determining that the remote computing device is not within a short-range wireless communication range; and communicating with the remote computing device using the wireless internet communication link.

4. The chlorinator system of claim 1, wherein the operations further comprise:

receiving an additional short-range wireless communication request from an additional pool and spa system component;

establishing a third short-range wireless communication link with the additional pool and spa system component;

dynamically updating a control menu to reflect available control options for the additional pool and spa system component; and controlling the at least one transceiver to wirelessly transmit instructions to the remote computing device to update a remote control menu of the remote computing device to reflect the available control options for the additional pool and spa system component.

5. The chlorinator system of claim 1, wherein the operations further comprise:

downloading a firmware package from the remote computing device or a cloud source;

determining routing of individual firmware updates of the firmware package to the at least one pool and spa system component; and controlling the at least one transceiver to wirelessly transmit the individual firmware updates to the at least one pool and spa system component.

6. The chlorinator system of claim 1, wherein the short-range wireless communication link comprises a Bluetooth communication link.

7. The chlorinator system of claim 1, wherein the at least one pool and spa system component comprises a pool sensor, a pool lighting controller, a water feature, a spa controller, a pump, a heater, or any combination thereof.

8. The chlorinator system of claim 1, further comprising:

a synchronous rectifier configured to convert an alternating current power source to a direct current power source to provide power to the swimming pool chlorinator, the at least one transceiver, the processor, and the non-transitory computer-readable storage medium.

9. The chlorinator system of claim 1, wherein the operations further comprise:

modularly adding additional short-range wireless communication links with additional pool or spa system components such that the additional pool or spa system components are controllable using the control signals transmitted by the at least one transceiver.

* * * * *